US008610618B2

(12) United States Patent
Provost et al.

(10) Patent No.: US 8,610,618 B2
(45) Date of Patent: Dec. 17, 2013

(54) METHOD FOR IDENTIFYING A FACILITY ON THE GROUND OR AT SEA

(75) Inventors: Claude Provost, Laval (FR); Bertrand Schoendorff, Etrelles (FR)

(73) Assignee: Thales, Neuilly sur Seine (FR)

( * ) Notice: Subject to any disclaimer, the term of this patent is extended or adjusted under 35 U.S.C. 154(b) by 127 days.

(21) Appl. No.: 13/120,240

(22) PCT Filed: Sep. 23, 2009

(86) PCT No.: PCT/EP2009/062333
§ 371 (c)(1),
(2), (4) Date: Oct. 4, 2011

(87) PCT Pub. No.: WO2010/034747
PCT Pub. Date: Apr. 1, 2010

(65) Prior Publication Data
US 2012/0050088 A1    Mar. 1, 2012

(30) Foreign Application Priority Data

Sep. 23, 2008  (FR) ..................... 08 05221

(51) Int. Cl.
*G01S 13/00* (2006.01)
*G01S 13/74* (2006.01)

(52) U.S. Cl.
USPC ............... 342/29; 342/30; 342/42; 342/45; 342/73; 342/74

(58) Field of Classification Search
USPC ......................... 342/29–51, 73, 74
See application file for complete search history.

(56) References Cited

U.S. PATENT DOCUMENTS

| | | | | |
|---|---|---|---|---|
| 3,375,516 A | * | 3/1968 | Hart et al. | 342/51 |
| 3,833,904 A | * | 9/1974 | Gebhardt et al. | 342/83 |
| 3,981,009 A | * | 9/1976 | Bishop | 342/45 |
| 4,107,675 A | * | 8/1978 | Sellers et al. | 342/42 |
| 4,143,369 A | * | 3/1979 | Ayers | 342/45 |
| 5,223,837 A | * | 6/1993 | Grossman | 342/13 |
| 5,231,413 A | * | 7/1993 | Dubois | 343/833 |
| 5,235,336 A | * | 8/1993 | Sturm et al. | 342/30 |
| 5,280,285 A | * | 1/1994 | Curtis et al. | 342/32 |
| 5,361,071 A | * | 11/1994 | van Zon | 342/42 |
| 5,463,398 A | * | 10/1995 | Young | 342/46 |
| 5,552,788 A | * | 9/1996 | Ryan et al. | 342/30 |

(Continued)

FOREIGN PATENT DOCUMENTS

| | | |
|---|---|---|
| EP | 1189073 A | 3/2002 |
| EP | 1372127 A | 12/2003 |
| JP | 62011307 A | 1/1987 |

*Primary Examiner* — Jack W Keith
*Assistant Examiner* — Peter Bythrow
(74) *Attorney, Agent, or Firm* — Baker & Hostetler LLP

(57) ABSTRACT

The present invention includes a method for identifying a facility on the ground or at sea, the method being implemented on an airborne responder linked to at least two antennas, the method including a step of choosing a first transmission antenna and a step of transmitting an interrogation message from the chosen antenna. The method further includes testing whether a response has been received by the responder, and, if at least one response signal is received by at least one of the antennas, choosing a transmission antenna as a function of the response signal or signals received. If no response message is received, a different transmission antenna is chosen from the antenna that transmitted the last interrogation message. The method is repeated from the step of transmitting the interrogation message.

9 Claims, 3 Drawing Sheets

(56) References Cited

U.S. PATENT DOCUMENTS

| | | | |
|---|---|---|---|
| 5,583,507 A * | 12/1996 | D'Isepo et al. | 342/45 |
| 5,712,628 A * | 1/1998 | Phillips et al. | 340/10.51 |
| 5,767,802 A * | 6/1998 | Kosowsky et al. | 342/45 |
| 5,842,118 A * | 11/1998 | Wood, Jr. | 455/101 |
| 5,867,535 A | 2/1999 | Phillips et al. | |
| 6,222,480 B1 * | 4/2001 | Kuntman et al. | 342/30 |
| 6,313,783 B1 * | 11/2001 | Kuntman et al. | 342/32 |
| 6,545,632 B1 * | 4/2003 | Lyons et al. | 342/45 |
| 6,587,069 B2 * | 7/2003 | Ringwald et al. | 342/30 |
| 6,789,016 B2 * | 9/2004 | Bayh et al. | 701/301 |
| 6,885,695 B1 * | 4/2005 | Coniglione | 375/147 |
| 7,006,032 B2 * | 2/2006 | King et al. | 342/29 |
| 7,015,856 B1 * | 3/2006 | Johnson | 342/32 |
| 7,362,827 B2 * | 4/2008 | Provost | 375/329 |
| 7,414,567 B2 * | 8/2008 | Zhang et al. | 342/29 |
| 7,436,350 B1 * | 10/2008 | Maloratsky et al. | 342/30 |
| 7,825,858 B2 * | 11/2010 | Blessing et al. | 342/442 |
| 8,269,684 B2 * | 9/2012 | Robin et al. | 343/749 |
| 2002/0014986 A1 * | 2/2002 | Ringwald et al. | 342/30 |
| 2003/0233192 A1 * | 12/2003 | Bayh et al. | 701/301 |
| 2005/0156777 A1 * | 7/2005 | King et al. | 342/29 |
| 2007/0018881 A1 * | 1/2007 | King | 342/46 |

* cited by examiner

METHOD FOR IDENTIFYING A FACILITY ON THE GROUND OR AT SEA

CROSS-REFERENCE TO RELATED APPLICATIONS

This application is a National Stage of International patent application PCT/EP2009/062333, filed on Sep. 23, 2009, which claims priority to foreign French patent application No. FR 08 05221, filed on Sep. 23, 2008, the disclosures of which are incorporated by reference in their entirety.

FIELD OF THE INVENTION

The present invention relates to a method for identifying a facility on the ground. It applies notably to airborne responders, for identifying equipment placed on the ground or at sea or for verifying the presence or the absence of ground troops inside a determined zone.

BACKGROUND OF THE INVENTION

When an aircraft detects the presence of facilities on the ground or at sea, it is sometimes desired to identify these facilities in a very short time, of the order for example of a second. This identification may be made easier when said facilities are provided with a transponder, which may be summoned by a radioelectric message emitted from the aircraft. To avoid extra onboard hardware, the responder situated in the aircraft may be used to transmit an interrogation message to the facilities detected on the ground.

By way of reminder, an airborne responder is a device making it possible to identify the aircraft on which it is placed. When an interrogation message in the standard format is received by the responder, the latter responds by transmitting a code specific to the aircraft. More particularly, "friend or foe" responders, often designated by the acronym IFF standing for "Identification Friend or Foe", are suitable for responding, when a friendly interrogation message is received, with an encrypted code indecipherable to the enemy troops. Furthermore, the mode of operation of a responder may be reversed, the responder transmitting a message without having been previously summoned through an interrogation. In this way, an aircraft can, for example, spontaneously signal its presence to facilities situated on the ground or at sea. In the case of military use, an IFF responder operating in reverse mode can, for example, transmit interrogation messages before triggering an air-ground attack, for the purposes of ensuring that no friendly troop is situated in the targeted zone. The aircraft equipped with the responder then watches out for a possible response from a friendly facility on the ground.

Conventionally, an aircraft fitted with a responder comprises two transmission antennas linked to this responder, a first, so-called top, antenna being placed above the fuselage, a second, so-called bottom, antenna being placed under the fuselage. Indeed, the presence of two antennas is notably justified by the fact that when, for example, the aircraft banks in a turn, one of the two antennas may be masked in relation to the facilities with which it might communicate, the other antenna then making it possible to establish a communication linkup. Generally, the responder operating in reverse mode transmits a series of messages, the messages being transmitted alternately on the top antenna and on the bottom antenna.

However, this mode of operation gives rise to numerous losses of interrogation messages. Indeed, when one of the two antennas is masked, half the messages of the series are lost, that is to say not received by the ground. This loss is unfavorable to a possible air-ground identification, since it reduces the probability of a ground facility receiving a message.

A technique for solving this problem is to increase the number of interrogation messages transmitted, stated otherwise to lengthen in time the series of messages transmitted, the density of the messages over time being standardized and non-modifiable. However, this solution leads, on the one hand, to a lack of discretion and, on the other hand, to the exceeding of the acceptable duration for performing a possible identification.

SUMMARY OF THE INVENTION

An aim of the invention is to maximize the probability of identifying a facility on the ground or at sea while limiting the loss of interrogation messages transmitted by a responder operating in reverse mode. For this purpose, the subject of the invention is a method for identifying a facility on the ground or at sea, the method being implemented on an airborne responder linked to at least two antennas, the method comprising a step of choosing a first transmission antenna and then a step of transmitting at least one interrogation message from the chosen antenna, the method being characterized in that it furthermore comprises at least the following steps:

testing whether a response signal answering the interrogation message has been received by the responder:
  if at least one response signal is received by at least one of the antennas of the responder, identifying the response signal or signals, and choosing a transmission antenna as a function of said response signals received;
  if no response signal is received, choosing a different transmission antenna from the antenna that transmitted the last interrogation message;

repeating the method from the step of transmitting the interrogation message.

According to one mode of implementation of the method according to the invention, the transmission antenna chosen when at least one response signal has been received by at least one of the antennas is, from among said antennas, that which has led, for the majority of the response signals received, to the best link budget.

According to one mode of implementation of the method according to the invention, during each iteration of the method, a test step is executed to decide whether an interrogation message need or need not still be transmitted, so that the series of interrogation messages is limited over time, notably so as to preserve the discretion of the aircraft in relation to hostile facilities.

According to one mode of implementation of the method according to the invention, the stopping of the transmission of the interrogation messages is decided by the test step when a fixed number N of messages has already been transmitted.

According to another mode of implementation of the method according to the invention, the stopping of the transmission of the interrogation messages is triggered by a clock signal.

According to another mode of implementation of the method according to the invention, when a transmission antenna has been chosen after at least one response signal has been received by at least one of the antennas of the responder, then the transmission antenna is no longer changed until the last interrogation message has been transmitted.

The identification method according to the invention may be used for an IFF responder, the interrogation messages being transmitted from said responder on the frequency dedicated to the transmissions of IFF responses, this frequency often being equal to 1090 MHz. The fact of transmitting an interrogation message on the frequency dedicated to the transmissions of responses from an IFF responder corresponds to a mode of operation termed "reverse IFF".

The subject of the invention is also an airborne responder linked to at least two antennas, a first antenna being placed above the fuselage of the aircraft equipped with the responder, the second antenna being placed under said fuselage, the responder implementing the identification method such as described above.

According to one embodiment, the responder is an IFF responder, the antennas linked to said responder being suitable for transmitting an interrogation message on the frequency 1090 MHz.

BRIEF DESCRIPTION OF THE DRAWINGS

Other characteristics will become apparent on reading the detailed description given by way of nonlimiting example which follows, offered in relation to appended drawings which represent.

The same references in different figures designate the same elements.

DETAILED DESCRIPTION

Figure 1:
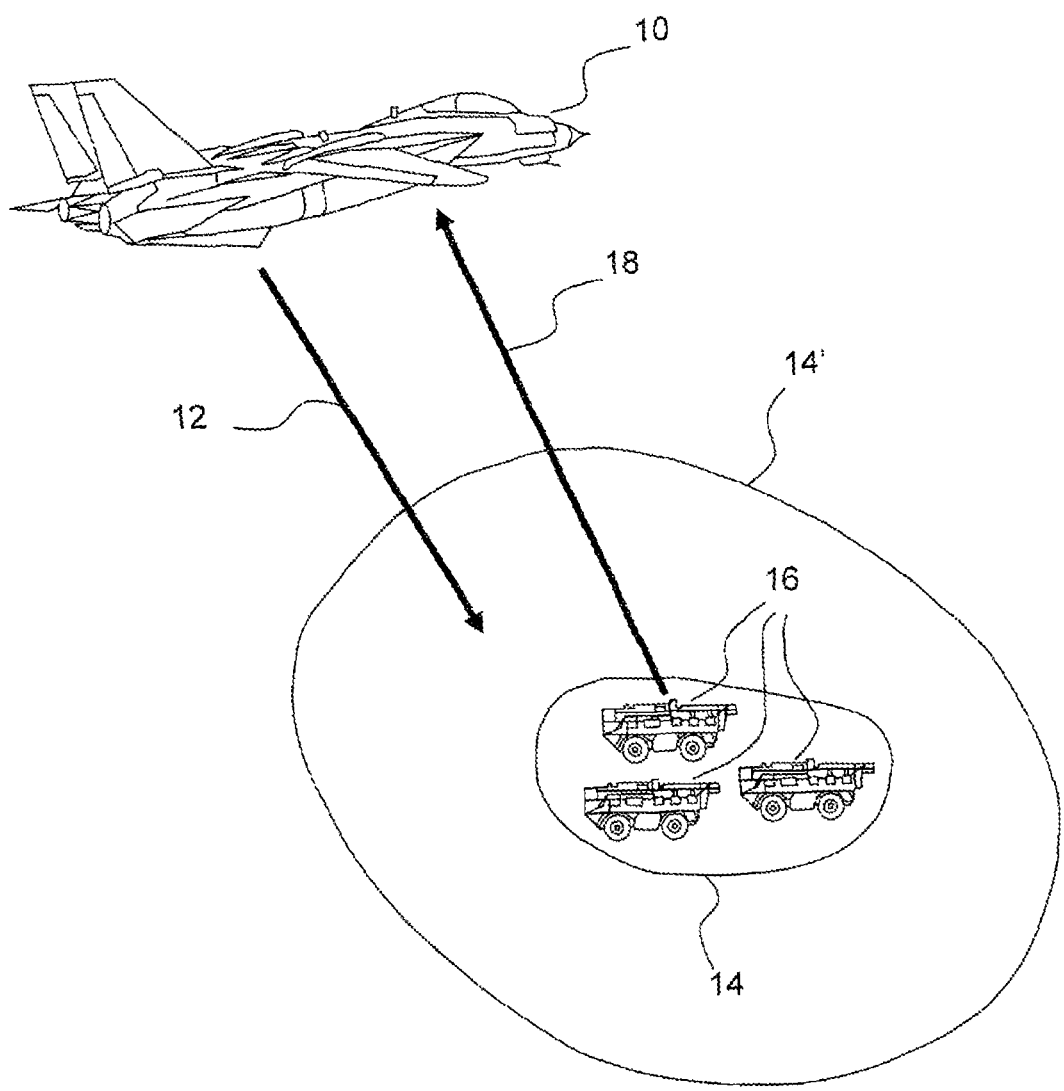
FIG. 1, a diagram illustrating the exchanges of messages between an airborne responder operating in reverse mode and an interrogator on the ground, FIG. 2, a schematic presenting the steps of a first mode of implementation of the method according to the invention, FIG. 3, a schematic presenting the steps of a second mode of implementation of the method according to the invention, FIG. 4, a schematic presenting the steps of a third mode of implementation of the method according to the invention, FIG. 5, a schematic presenting the steps of a fourth mode of implementation of the method according to the invention.

FIG. 1 presents a diagram illustrating the exchanges of messages between an airborne responder operating in reverse mode and an interrogator on the ground.

A responder placed on an airplane 10 and linked to two antennas 21, 22 having a transmit/receive function, transmits an interrogation message 12 via one of the two antennas 21, 22. In the example, the message is solely intended for facilities situated in a zone of interest 14 on the ground, said zone of interest 14 being encompassed by the zone 14' covered by the radiation of the antenna. The zone of interest 14 is specified in the interrogation message, so that when facilities, for example vehicles 16 included in the zone of interest 14, receive the interrogation message 12, these facilities transmit in return a response 18 comprising for example an identification code or their position.

Figure 2:
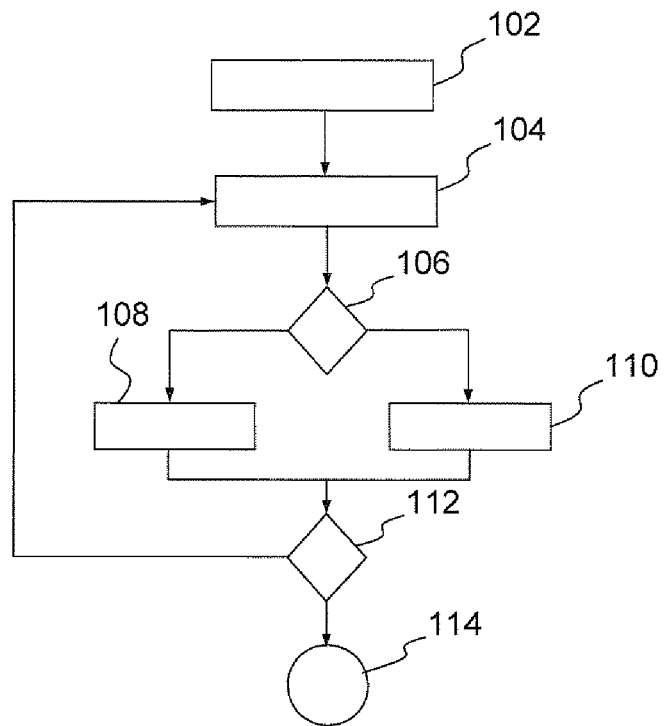

FIG. 2 presents, through a schematic, the steps of a first mode of implementation of the method according to the invention. The method is implemented on an aircraft such as that presented in FIG. 1 comprising a responder linked to at least two antennas.

Initially 102, a transmission antenna is chosen from among the antennas 21, 22 of the aircraft. The antenna can for example be chosen arbitrarily or randomly.

Subsequently 104, the responder transmits an interrogation message via the previously chosen antenna. For example, in the course of this step 104, an IFF responder transmits a message on the frequency 1090 MHz, which conventionally is dedicated to the transmission of a response to an interrogation message. A test 106 is thereafter performed to determine whether one or more responses have been received by the responder.

If the responder does not receive any response to the interrogation message transmitted, then a new transmission antenna is chosen, different from the last one that transmitted a message; this step is referenced 108 in FIG. 2.

If, conversely, the responder receives one or more responses to the interrogation message transmitted, then a new transmission antenna is chosen as a function of the response signals received, referenced step 110 in FIG. 2. For example, if a single response signal is received, the transmission antenna chosen is that for which the link budget obtained is the best in relation to the response signal received, that is to say the link budget between the ground antenna and the antenna of the airborne responder. If several response signals are received—for example, several facilities present in the zone of interest on the ground respond to the interrogation message previously transmitted by the responder—the transmission antenna is chosen as a function of these multiple response signals. For example, for each response signal, the link budgets are compared between the various antennas linked to the responder and the transmission antenna chosen is that for which the link budgets obtained are mostly better than with the other antennas. By way of illustration, if a responder is linked to two antennas, for example a top antenna and a bottom antenna, if five response signals have been received and if for three of them the link budget is better on the bottom antenna, then the bottom antenna will be chosen to transmit the next interrogation message to the zone of interest. Stated otherwise, the antenna chosen is that for which the link budget with the zone of interest was the best. Other criteria for choosing an antenna may be considered.

In contradistinction to a conventional method in which a simple alternation between the transmission antennas is performed, the quality of the response message picked up by the antennas is taken into account in the method according to the invention so as to determine the antenna maximizing the probability of reaching ground transponders. Moreover, in parallel with this step 110 of choosing antenna, identification processings may be performed on the basis of the response received, notably so as to ensure, in a military context, that the response arises from a friendly facility.

Operation in reversed mode (in the example, the IFF responder operating in reversed mode) entails several differences with respect to the conventional operation of an airborne responder, which would respond to an interrogation that came from the ground. A first difference resides in the temporal aspect: in a conventional mode, the response transmitted by the airborne responder toward the ground is synchronous and subsequent to the interrogation transmitted by the ground facility whereas in reversed mode, the interrogations are not synchronous with the responses originating from the ground. Hence, in reversed mode, there may be relatively long time gaps between the transmission of the responses and the transmission of the interrogations (a few hundred milliseconds, or indeed about a second, for example) and the reception configuration could have altered in this interval. A second difference relates to the multiplicity of the ground systems aimed at in the case of the reversed mode, whereas a single interrogator on the ground is concerned in the conventional mode. A third difference relates to the omni-directional character of the ground antennas within the framework of operation in reversed mode, the antenna of the interrogator on the ground having a directional pattern within the framework of operation in conventional mode.

Thus, in most applications in reversed mode, the intelligent choice of the antenna must make it possible to obtain the best possible link budget with the zone of interest aimed at, and not simply with a single facility.

Once the new transmission antenna has been chosen, a test 112 is executed to determine whether an interrogation message need still be transmitted. Indeed, a responder generally transmits a limited series in terms of number of messages, notably when wishing not to overly impair the aircraft's radioelectric discretion. Hence, in the example, the test 112 determines whether the number of messages transmitted is greater than a number N fixed in advance. If the number of messages transmitted is less than or equal to N, then a new iteration of the method is executed from step 104 of transmitting an interrogation message. If more than N messages have already been transmitted, then the method ends 114.

According to another mode of implementation of the identification method according to the invention, when a response has been received by the responder, the test 112 decides whether or not the method should stop, according to the nature of the message received in the response. For example, within the framework of a use of IFF responders, if a "friendly" response is received, then the test 112 decides to stop the transmissions of interrogation messages.

Figure 3:
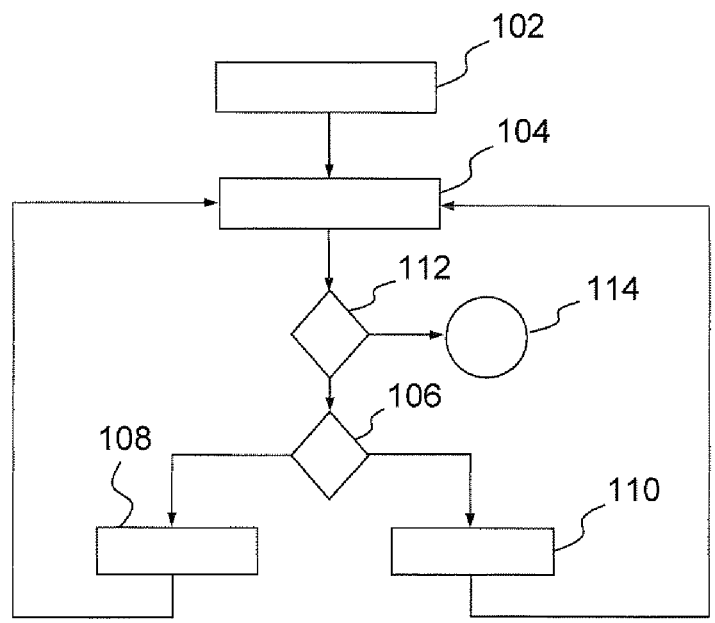

The order of the steps presented in the first mode of implementation in FIG. 2 is wholly non-limiting, as illustrated for example by FIG. 3.

FIG. 3 presents, through a schematic, the steps of a second mode of implementation of the method according to the invention. According to this second mode of implementation, the test step 112 deciding on the end or otherwise of the method is executed before the test step 106 determining whether a response has or has not been received by the responder.

Thus, initially 102, a transmission antenna is chosen from among the antennas of the aircraft. Subsequently 104, the responder transmits an interrogation message via the previously chosen antenna. A test 112 is thereafter executed to decide whether or not the method should stop 114. If, on completion of this test 112, execution of the method is continued, a test 106 for determining whether a response has been received by the responder is executed. If no response has been received, then a different antenna from the last antenna used to transmit a message is chosen 108. Conversely, if a response has been received by the responder, a step 110 of choosing a new transmission antenna as a function of the response received is executed, as detailed above in FIG. 2. On completion of the previous steps 108, 110, the transmission antenna has been chosen and the method is repeated from step 104 of transmitting an interrogation message.

Figure 4:
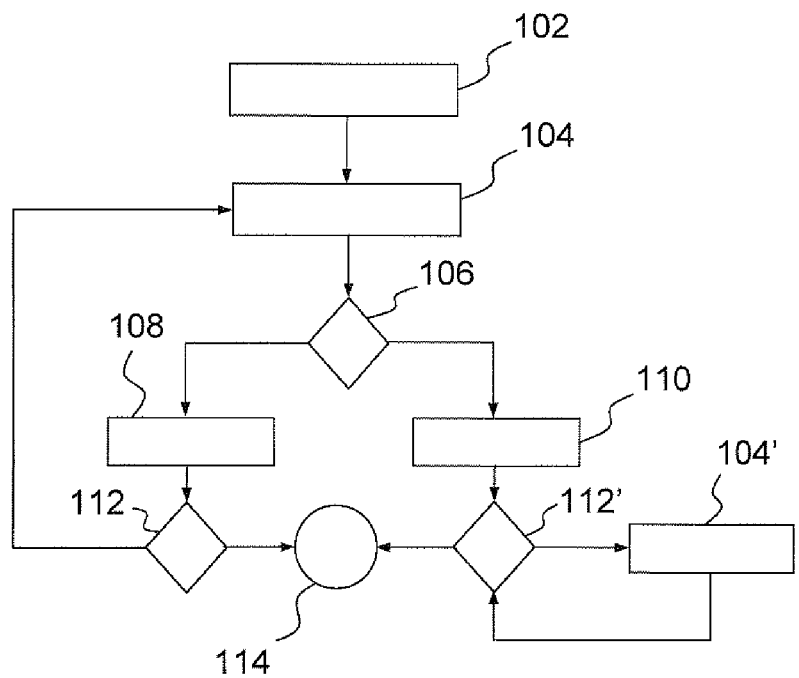

FIG. 4 presents, through a schematic, the steps of a third mode of implementation of the method according to the invention. According to this third mode of implementation, as soon as a response has been received by the responder and a new transmission antenna has been selected 110, then this antenna remains the transmission antenna until the last message of the series has been transmitted.

Thus, the method of FIG. 4 differs from that of FIG. 2 in that when a response has been received and the test 112' deciding whether or not the method should stop indicates the continuation of the method, then another step 104' of transmitting an interrogation message is executed. On completion of this transmission step 104', the method is repeated from the test step 112' deciding whether or not the method should stop, so that the transmission antenna stays the same for all the remaining iterations. This implementation can notably be chosen when the link budget conditions are stable—the envisaged duration of transmission of the series of interrogation messages is short compared with the duration of change of configuration of the aircraft; stated otherwise, according to this assumption if an antenna is masked from the ground at a given instant, this same antenna then probably remains masked from the ground for the duration of transmission of the series of messages.

Figure 5:
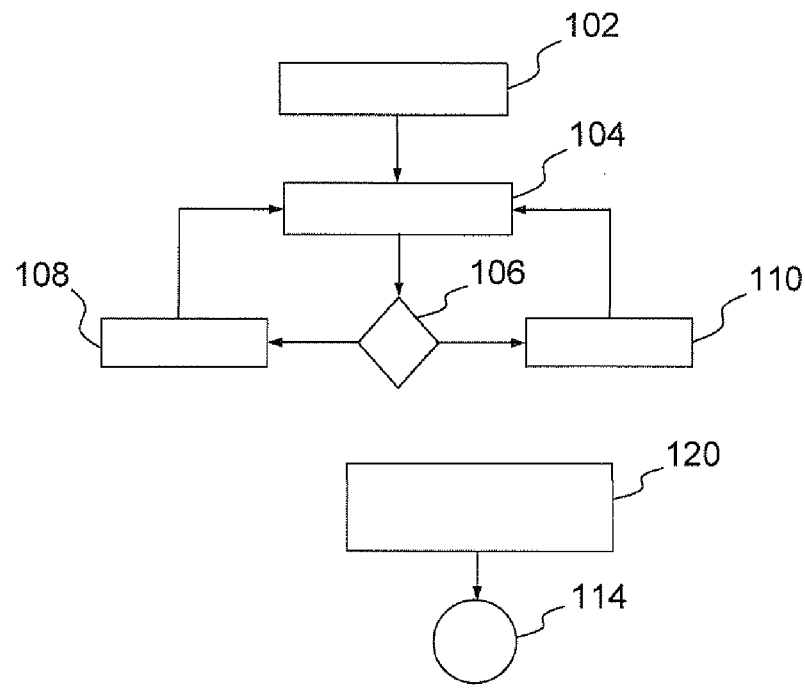

FIG. 5 presents, through a schematic, the steps of a fourth mode of implementation of the method according to the invention. According to this mode of implementation, the method's stopping condition depends on a clock.

Thus, the method of FIG. 4 differs from that of FIG. 2 in that on completion of steps 108, 110 of selecting the new transmission antenna, the method is repeated directly from the transmission step 104, while in parallel a clock 120 signals the end 114 of the method when a fixed period has elapsed.

An advantage of the method according to the invention is that it does not require any unwieldy hardware intervention. Indeed, a software modification of the onboard responder suffices to implement the algorithm on an existing system.

The invention claimed is:

1. A method for identifying a facility on the ground or at sea, the method being implemented on an airborne responder linked to at least two antennas, said method comprising:

choosing, at the airborne responder, a first antenna among the at least two antennas;

transmitting, using the airborne responder, at least one interrogation message from the chosen first antenna to the facility on the ground or at sea;

testing, at the airborne responder, whether a response signal answering the interrogation message has been received by the airborne responder;

if at least one response signal is received by at least one of the at least two antennas of the airborne responder, identifying the at least one response signal, and choosing one of the at least two antennas as a transmission antenna as a function of said at least one response signal received;

if no response signal is received, choosing a different transmission antenna from the chosen one of the at least two antennas that transmitted the last interrogation message; and repeating said transmitting the interrogation message or messages, said testing, said identifying, said choosing one of the at least two antennas as a transmission antenna as a function of said response signals received, and said choosing a different transmission antenna from the chosen one of the at least two antennas, wherein, when the at least one response signal has been received by at least one of the at least two antennas of the airborne responder, the transmission antenna chosen is that which has led, for a majority of the at least one response signals received, to a best link budget.

2. The method of identification as claimed in claim 1, wherein, during each iteration of said repeating, a test step is executed to decide whether a respective interrogation message for a particular iteration need or need not still be transmitted.

3. The method of identification as claimed in claim 2, wherein a stopping of the transmission of the interrogation messages is decided by the test step when a fixed number of messages has already been transmitted.

4. The method of identification as claimed in claim 1, wherein a stopping of the transmission of the interrogation messages is triggered by a clock signal.

5. The method of identification as claimed in claim 1, wherein, when the transmission antenna has been chosen after the at least one response signal has been received by the at least one of the at least two antennas of the airborne responder, then the transmission antenna is no longer changed until the last interrogation message has been transmitted.

6. The method of identification as claimed in claim 1, wherein the airborne responder is an Identification Friend or Foe (IFF) responder and the interrogation messages are transmitted from the IFF responder on the frequency dedicated to transmissions of IFF responses.

7. The method of identification as claimed in claim 1, wherein the airborne responder is an Identification Friend or Foe (IFF) responder and the interrogation messages are transmitted from the IFF responder at a frequency of 1090 MHz.

8. An airborne responder linked to at least two antennas, a first antenna being placed above a fuselage of an aircraft on which the airborne responder is placed, a second antenna being placed under said fuselage, the airborne responder configured to implement:

choosing, at the airborne responder, the first antenna;

transmitting, using the airborne responder, at least one interrogation message from the chosen first antenna to the facility on the ground or at sea;

testing, at the airborne responder, whether a response signal answering the interrogation message has been received by the airborne responder;

if at least one response signal is received by at least one of the at least two antennas of the airborne responder, identifying the at least one response signal, and choosing one of the at least two antennas as a transmission antenna as a function of said at least one response signal received;

if no response signal is received, choosing a different transmission antenna from the chosen one of the at least two antennas that transmitted the last interrogation message; and repeating said transmitting the interrogation message or messages, said testing, said identifying, said choosing one of the at least two antennas as a transmission antenna as a function of said response signals received, and said choosing a different transmission antenna from the chosen one of the at least two antennas, wherein, when the at least one response signal has been received by at least one of the at least two antennas of the airborne responder, the transmission antenna chosen is that which has led, for a majority of the at least one response signals received, to a best link budget.

9. The airborne responder as claimed in claim 8, wherein the at least two antennas are linked to the airborne responder for transmitting an interrogation message at a frequency of 1090 MHz.

\* \* \* \* \*

UNITED STATES PATENT AND TRADEMARK OFFICE
CERTIFICATE OF CORRECTION

PATENT NO. : 8,610,618 B2 Page 1 of 1
APPLICATION NO. : 13/120240
DATED : December 17, 2013
INVENTOR(S) : Provost et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this
Twenty-second Day of September, 2015

Michelle K. Lee
*Director of the United States Patent and Trademark Office*